(12) United States Patent
Samuel et al.

(10) Patent No.: US 11,286,765 B2
(45) Date of Patent: Mar. 29, 2022

(54) MEASURING INVISIBLE LOST TIME IN DRILLING OPERATIONS

(71) Applicant: Halliburton Energy Services, Inc., Houston, TX (US)

(72) Inventors: Robello Samuel, Cypress, TX (US); Vikrant Lakhanpal, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 522 days.

(21) Appl. No.: 16/341,966

(22) PCT Filed: Dec. 7, 2016

(86) PCT No.: PCT/US2016/065304
§ 371 (c)(1),
(2) Date: Apr. 15, 2019

(87) PCT Pub. No.: WO2018/106223
PCT Pub. Date: Jun. 14, 2018

(65) Prior Publication Data
US 2019/0242236 A1    Aug. 8, 2019

(51) Int. Cl.
*E21B 45/00*    (2006.01)
*G07C 3/08*    (2006.01)
*G05B 19/4155*    (2006.01)
*G05B 19/042*    (2006.01)
*E21B 21/08*    (2006.01)
*E21B 44/02*    (2006.01)

(52) U.S. Cl.
CPC ............ *E21B 45/00* (2013.01); *E21B 21/08* (2013.01); *E21B 44/02* (2013.01); *G05B 19/042* (2013.01); *G05B 19/4155* (2013.01); *G07C 3/08* (2013.01); *G05B 2219/45129* (2013.01)

(58) Field of Classification Search
None
See application file for complete search history.

(56) References Cited

U.S. PATENT DOCUMENTS

| 4,631,514 | A |  | 12/1986 | Fujiwara |  |
| 5,076,399 | A |  | 12/1991 | Horbruegger et al. |  |
| 5,983,162 | A | * | 11/1999 | Huang | G06F 17/14 702/15 |

(Continued)

OTHER PUBLICATIONS

CA Application Serial No. 3,037,480; Office Action; dated Apr. 7, 2020, 3 pages.

(Continued)

*Primary Examiner* — Catherine T. Rastovski
*Assistant Examiner* — Leonard S Liang
(74) *Attorney, Agent, or Firm* — DeLizio, Peacock

(57) ABSTRACT

A method may comprise drilling a wellbore penetrating a subterranean formation; collecting drill time data for the drilling; converting the drill time data into segmented drill time data; decomposing the segmented drill time data into intrinsic mode functions (IMFs) using an empirical mode decomposition; reconstructing the segmented drill time data by combining the IMFs with different weights, thereby producing modified segmented drill time data; and calculating an invisible lost time for the drilling based on the segmented drill time data and the modified segmented drill time data.

20 Claims, 4 Drawing Sheets

(56) References Cited

U.S. PATENT DOCUMENTS

| | | | |
|---|---|---|---|
| 6,311,130 B1* | 10/2001 | Huang | G06F 17/14 702/15 |
| 6,381,559 B1* | 4/2002 | Huang | G06F 17/14 702/189 |
| 6,738,734 B1* | 5/2004 | Huang | G06F 17/14 702/179 |
| 6,769,497 B2* | 8/2004 | Dubinsky | E21B 44/005 175/27 |
| 6,825,633 B2 | 11/2004 | Hamann et al. | |
| 8,515,619 B2 | 8/2013 | Yamakado et al. | |
| 2003/0033094 A1* | 2/2003 | Huang | G06F 17/14 702/39 |
| 2004/0225382 A1 | 11/2004 | Brown et al. | |
| 2008/0065337 A1* | 3/2008 | Huang | G06F 17/14 702/66 |
| 2009/0105956 A1* | 4/2009 | Goswami | G01V 1/48 702/11 |
| 2011/0153217 A1* | 6/2011 | Rodney | E21B 47/007 702/9 |
| 2013/0163839 A1* | 6/2013 | Li | A61B 8/06 382/131 |
| 2014/0288766 A1 | 9/2014 | Chakaravarty et al. | |
| 2014/0326449 A1* | 11/2014 | Samuel | E21B 41/0092 166/250.01 |
| 2015/0226049 A1* | 8/2015 | Frangos | E21B 49/00 702/6 |
| 2016/0224757 A1* | 8/2016 | Melkonyan | G01R 23/167 |

OTHER PUBLICATIONS

De Oliveira, et al., "Offshore Drilling Improvement Through Automating the Rig State Detection Process—Implementation Process History and Proven Success", International Association of Drilling Contractors/Society of Petroleum Engineers Drilling Conference & Exhibition, Texas, 2016, 10 pages.

El Afifi, et al., "Enhance the Drilling & Tripping Performance on Automated Rigs With Fully Automated Performance Measurement", Society of Petroleum Engineers, Middle East Intelligent Oil & Gas Conference & Exhibition, Abu Dhabi UAE, Sep. 2015, 12 pages.

Lakhanpal, et al., "Deconvolution of Vibrational Data To Reduce the Ambiguity in Downhole Tool Failure", Society of Petroleum Engineers, Annual Technical Conference & Exhibition, Dubai UAE, Sep. 2016, 9 pages.

Maidla, et al., "Rigorous Drilling Nonproductive-Time Determination and Elimination of Invisible Lost Time: Theory and Case Histories", Society of Petroleum Engineers, Latin American & Caribbean Petroleum Engineering Conference, Peru, 2010, 9 pages.

Zausa, et al., "Advanced Drilling Time Analysis Through the Combination of Operations Reporting & Sensors Data", 11th Offshore Mediterranean Conference & Exhibition, Italy, Mar. 2013, 10 pages.

PCT Application Serial No. PCT/US2016/065304, International Search Report, dated Aug. 17, 2017, 3 pages.

PCT Application Serial No. PCT/US2016/065304, International Written Opinion, dated Aug. 17, 2017, 6 pages.

* cited by examiner

Segment number

Segment number

Segment number

Segment number

MEASURING INVISIBLE LOST TIME IN DRILLING OPERATIONS

BACKGROUND

The present application relates to enhancing the efficiency of drilling operations by predicting non-productive time.

When conducting a drilling operation, the time that the drill bit is not increasing the depth of the wellbore is called "non-productive time" or "NPT," and the time that the drill bit is increasing the depth of the wellbore is called "productive time." For example, cementing operations that involve running casing, pumping cement, and waiting for the cement to set contribute to NPT of a drilling operation. Other NPT contributors include, but are not limited to, rig transportation, rig maintenance, and tripping the drill string in and out of the wellbore. NPT can account for over 30% of the costs associated with a drilling operation.

Within either productive time or NPT, a drilling operation may experience "invisible lost time" or "ILT," which is the time lost because a portion of the drilling operations is not performed at maximum efficiency. For example, if drilling parameters like drill bit revolutions per minute are not optimized, then the rate of penetration may be reduced and result in slower drilling, which contributes to ILT during productive time of the drilling operation. In another example, during a cementing portion of the drilling operation, if the cement takes longer to set than scheduled, the ILT during the NPT of the drilling operation increases.

The ILT is not always easily measured and is typically assessed after the portion of the drilling operation is completed by comparing the actual operation duration to a best practice target. However, this method is subjective and only illustrates that ILT was present. This method of assessing ILT does not address the root cause so that steps may be taken to mitigate ILT.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to enhancing the efficiency of drilling operations by measuring and mitigating ILT.

Figure 1:
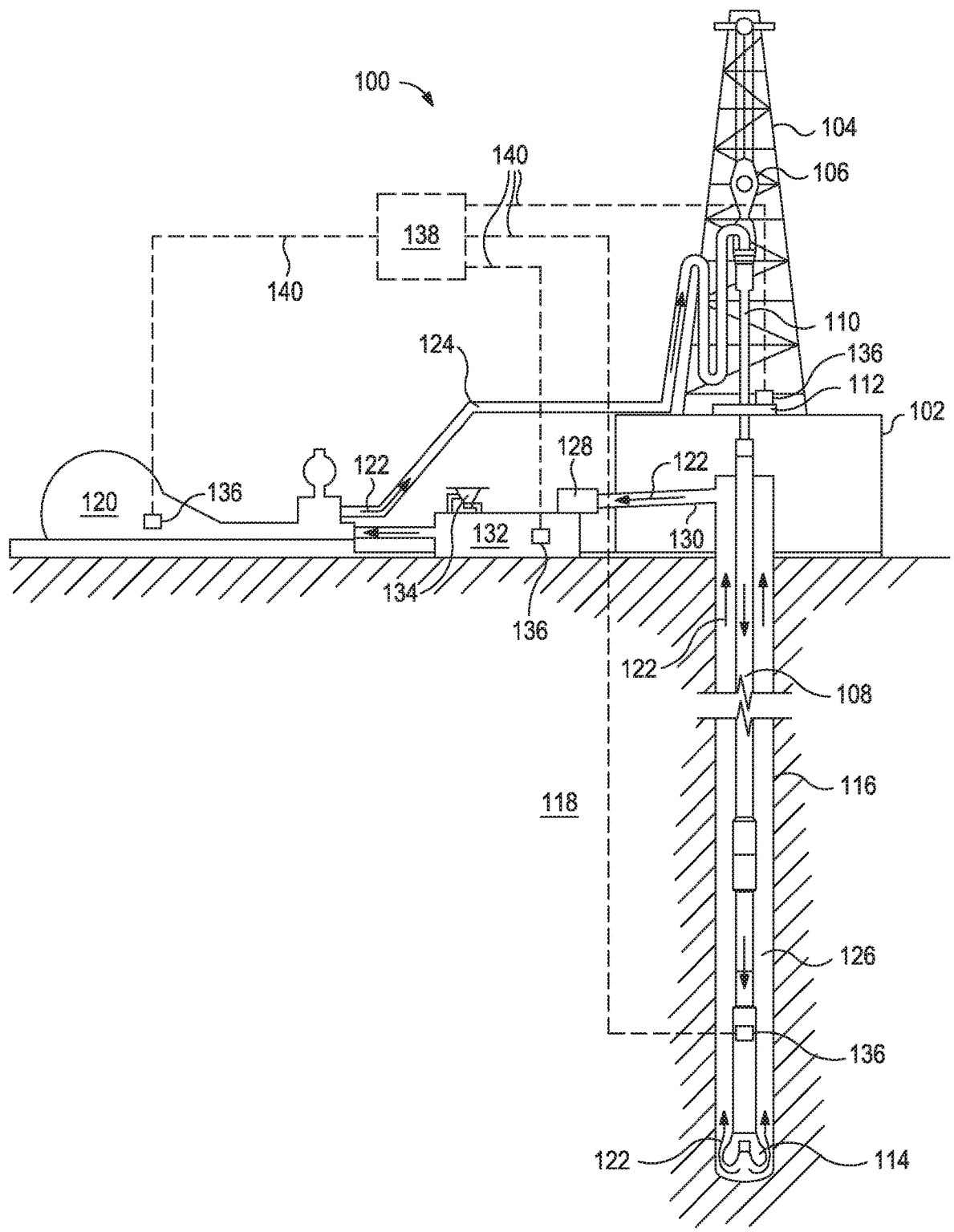
FIG. 1 illustrates an exemplary drilling system for drilling a wellbore penetrating a subterranean formation.

FIG. 1 illustrates a drilling system 100 for drilling a wellbore 116 penetrating a subterranean formation and performing the methods described herein. It should be noted that while FIG. 1 generally depicts a land-based system, those skilled in the art will readily recognize that the principles described herein are equally applicable to subsea operations that employ floating or sea-based platforms and rigs, without departing from the scope of the disclosure.

As illustrated, the drilling system 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole forming wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling system 100 to facilitate its proper function, without departing from the scope of the disclosure.

The drilling fluids 122 may be formed via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed drilling fluids 122 may be formed at any other location in the drilling system 100. In at least one embodiment, for example, there could be more than one retention pit 132, such as multiple retention pits 132 in series. Moreover, the retention pit 132 may be representative of one or more fluid storage facilities and/or units where the components of the drilling fluid 122 may be stored, reconditioned, and/or regulated until added to the drilling fluid 122. The disclosed drilling fluid 122 may directly or indirectly affect the components and equipment of the drilling system 100.

The drilling system 100 may also include one or more sensors 136 (four shown) that measure one or more parameters of the drilling in real-time. Exemplary parameters may include, but are not limited to, rate of penetration of the drill bit 114 into the subterranean formation, weight on the drill bit 114, torque applied to a drill string 108, rotary speed of the drill bit 114, flow rate of the drilling fluid 122, and the like, and any combination thereof. Exemplary sensors 136 may include, but are not limited to, temperature sensors, pressure sensors, flow rate sensors, viscometers, and the like, and any combination thereof, which may be located in the wellbore 116, near the drill bit 114, along the drill string 108, at the well head (not labeled), in wellbore tools on the drilling assembly 100 (e.g., shakers and pumps), and the like, and any combination thereof.

The drilling assembly 100 further includes a control system 138 communicably coupled 140 to the sensors 136. As described further herein, the control system 138 may include one or more processors that receive data from the sensors 136 and/or perform the method and analyses described herein.

Figure 2:
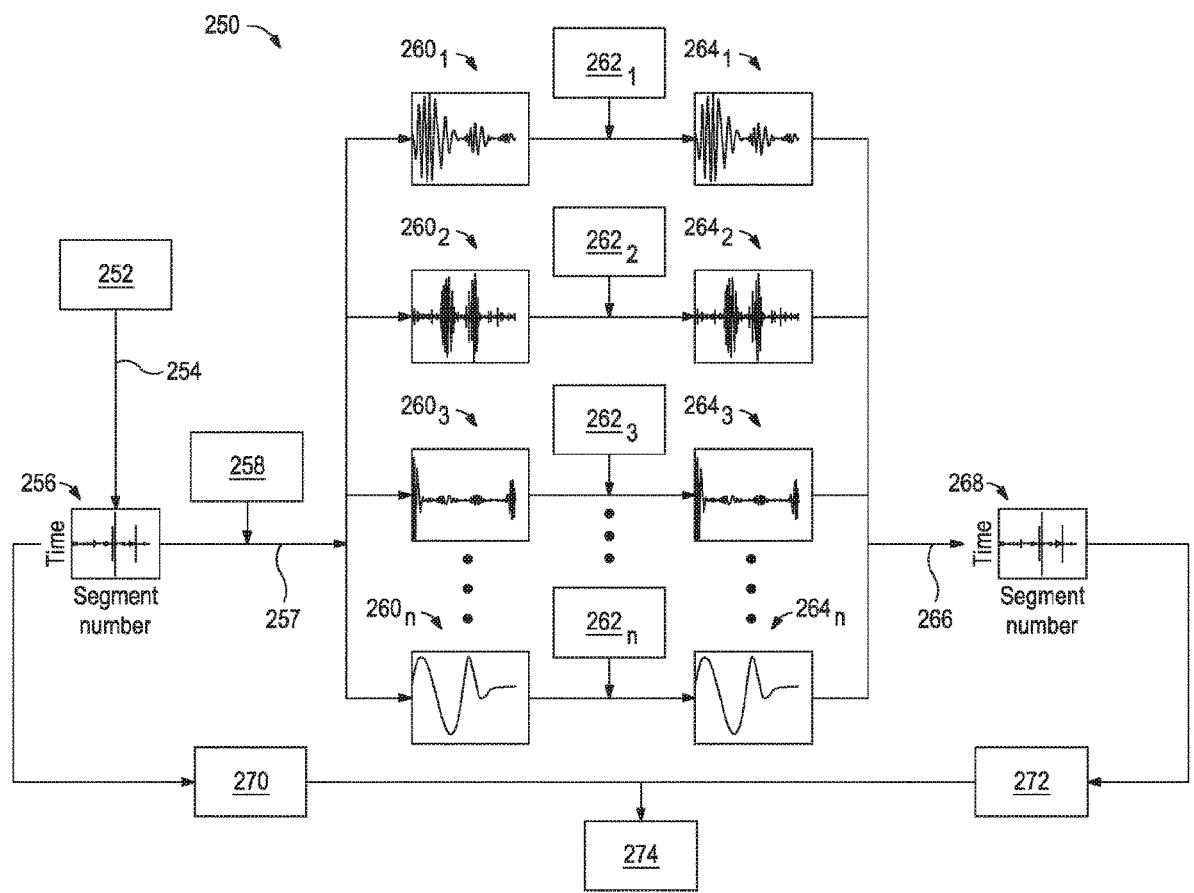
FIG. 2 provides an illustrative diagram of an exemplary analysis method for determining ILT.

FIG. 2 provides an illustrative diagram of an exemplary analysis method 250 for determining ILT according to some embodiments of the present disclosure. The illustrated analysis method 250 includes converting 254 drill time data 252 (i.e., drilling depth as a function of time) into segmented drill time data 256. As used herein, the term "segmented drill time data" refers to a mathematical representation of the time required to drill segments of a specific length during a portion of the drilling operation. For example, if the segment length is 100 feet and the portion of the drilling operation is the first 10,000 feet drilled, then, the segmented drill time data 256 is a mathematical representation (e.g., a histogram or table) of the amount of time it takes to drill each 100 feet of the first 10,000 feet drilled. For example, the segmented drill time data 256 may include data points for the $30^{th}$ interval (2900 feet to 3000 feet) taking 15 minutes, the $31^{st}$ interval (3000 feet to 3100 feet) taking 25 minutes, and the $32^{nd}$ interval (3100 feet to 3200 feet) taking 22 minutes.

The segmented drill time data 256 is decomposed 257 using an empirical mode decomposition (EMD) 258 to produce intrinsic mode functions (IMFs) $260_1$-$260_n$. Then, a weight $262_1$-$262_n$ is applied to each of the IMFs $260_1$-$260_n$ to produce weighted IMFs $264_1$-$264_n$ that are combined 266 to produce a modified segmented drill time data 268. The weights $262_1$-$262_n$ are determined by an estimation process that may be carried out automatically using a genetic algorithm that optimizes the weights $262_1$-$262_n$ for their respective IMFs $260_1$-$260_n$ to maximize the kurtosis and entropy of the segmented drill time data 256.

A nonproductive time 270 is calculated based on the segmented drill time data 256, and a modified nonproductive time 272 is calculated based on the modified segmented drill time data 268. The difference between the modified nonproductive time 272 and the nonproductive time 270 is the ILT 274.

Figure 3A:
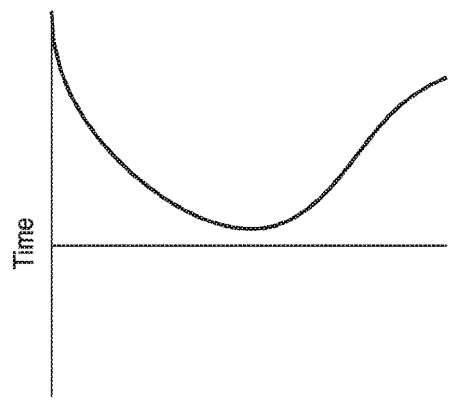
FIGS. 3A-D illustrates four potential curve shapes for the final intrinsic mode function (IMF) of the segmented data.
Figure 3B:
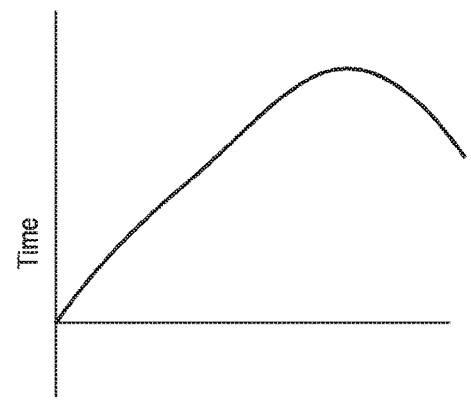
Figure 3C:
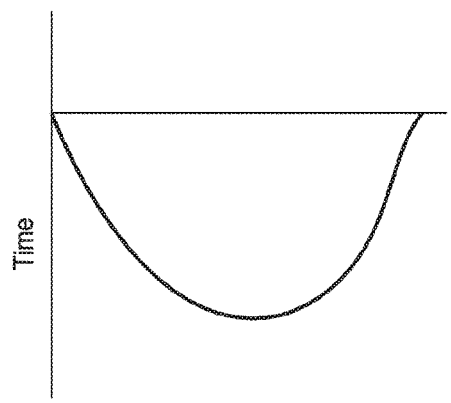
Figure 3D:
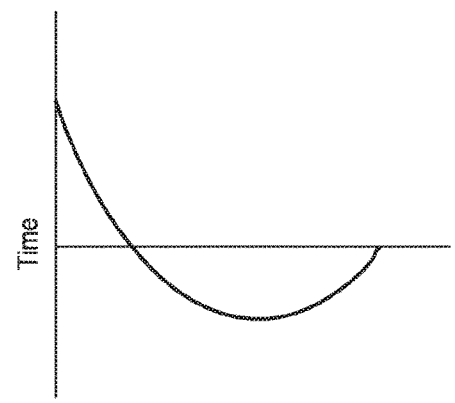

Further, the shape of the final IMF $260_n$ obtained by performing EMD 258 on the segmented drill time data 256 as a whole or for portions of the drilling may be analyzed to determine if ILT 274 is occurring. The shape of the final IMF $260_n$ may have different parabolic shapes as shown in FIGS. 3A-D. If the ILT is too high, the parabolic shape of the final IMF $260_n$ is expected to have a positive amplitude with an upward parabolic trend as illustrated in FIG. 3A. The high ILT may, in some instances, result from a major breakdown occurring between the two portions of the drilling operation. If the ILT is high but not as high as in case of FIG. 3A (i.e., not a major breakdown), the parabolic shape of the final IMF $260_n$ is expected to show a positive amplitude with a downward parabolic trend as illustrated in FIG. 3B. If the ILT is low, the parabolic shape of the final IMF $260_n$ is expected to have a negative amplitude and be upward parabolic in nature as illustrated in FIG. 3C. Such a parabolic shape generally reflects a consistent performance by the crew. If the ILT is within moderate levels, neither too high nor not too low, the parabolic shape of the final IMF $260_n$ is expected to show an amplitude crossover with an upward parabolic trend as illustrated in FIG. 3D.

If an ILT 274 is detected, then the cause of the ILT 274 may be ascertained by analyzing drilling parameters like rate of penetration of the drill bit into the subterranean formation, weight on the drill bit, torque applied to a drill string, rotary speed of the drill bit, flow rate of the drilling fluid, and the like, and any combination thereof.

Figure 4:
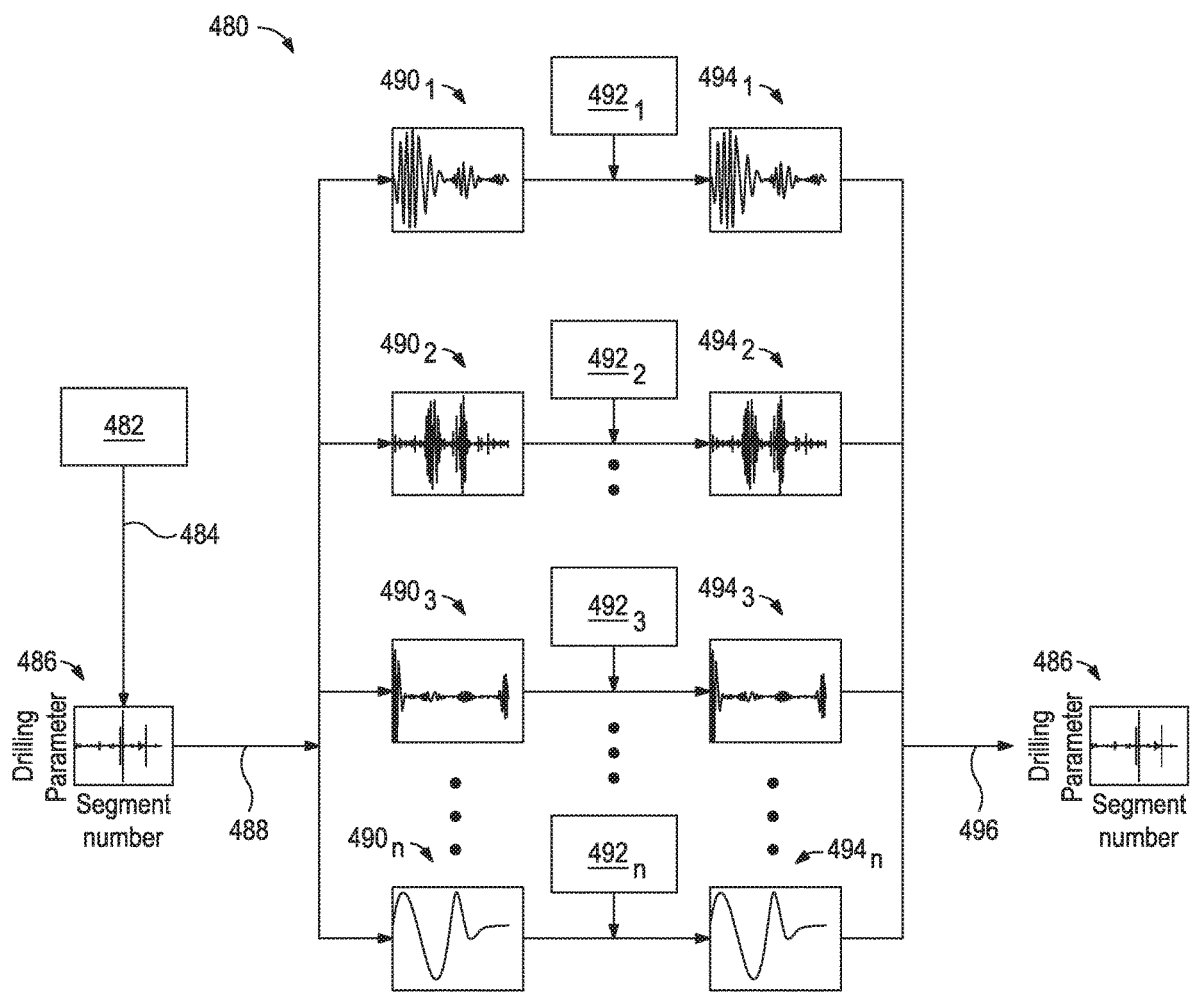
FIG. 4 provides an illustrative diagram of an exemplary analysis method for analyzing a drilling parameter when determining the cause of ILT.

FIG. 4 provides an illustrative diagram of an exemplary analysis method 480 for analyzing a drilling parameter when determining the cause of ILT. The drilling parameter data 482 (i.e., values (raw, normalize, or otherwise mathematically manipulated) of the drilling parameter) is converted 484 into segmented drilling parameter data 486. The segmented drilling parameter data 486 for a particular segment may be an average, median, maximum, minimum, or other suitable mathematical representation of the drilling parameter data for that segment. Generally, it is preferred that the segments for the segmented drilling parameter data 486 correspond to the segments for the segmented drill time data 256 of FIG. 2. However, in some instances, the segment length for the segmented drilling parameter data 486 may be longer or shorter than the segment length for the segmented drill time data 256 of FIG. 2. For example, ILT 274 may be detected with a first segment length, and the analysis of the drilling parameter data 482 may be performed at a shorter segment length for detecting more subtle potential cause of the ILT 274.

Similar to FIG. 2, the segmented drilling parameter data 486 is decomposed using an empirical mode decomposition 488 to produce IMFs $490_1$-$490_n$. Then a weight $492_1$-$492_n$ is applied to each of the IMFs $490_1$-$490_n$ to produce weighted IMFs $494_1$-$494_n$ that are combined 496 to produce a modified segmented drilling parameter data 498. The weights $492_1$-$492_n$ are determined by an estimation process that may be carried out automatically using a genetic algorithm that optimizes the weights $492_1$-$492_n$ for their respective IMFs $490_1$-$490_n$ to maximize the kurtosis and entropy of the segmented drilling parameter data 486.

The modified segmented drilling parameter data 498 may be analyzed to determine if it is a potential source of the ILT. When the modified segmented drilling parameter data 498 for a drilling parameter is substantially constant, the portions of the drilling operation associated with that drilling parameter are likely not contributing to ILT. Causation indicators of ILT are variations in the modified segmented drilling parameter data 498 like a steady downward or upward slope, an oscillation, and the like. For example, if modified segmented weight on bit data and modified segmented drill bit rpm data are substantially constant but modified segmented rate of penetration data is oscillating, the system may be experiencing vibrations and/or the drill bit may be worn, both of which contribute to ILT. In another example, if modified segmented drill bit rpm data and modified segmented rate of penetration data are oscillating but modified segmented weight on bit data is substantially constant, the drill bit rpm may be modified to reduce the ILT. In yet another example, if modified segmented weight on bit data and modified segmented rate of penetration data are oscillating but modified segmented drill bit rpm data is substantially constant, the weight on bit may be modified to reduce the ILT.

Referring now to FIGS. 2-4, in some instances, after ILT 274 has been identified by the method described relative to FIG. 2 or a related method, the final IMF $260_n$ may be analyzed in portions to identify portions of the drilling (i.e., which drilling segments) contribute to ILT 274 (e.g., having a shape according to FIG. 3A or 3B). Then, the portions of the modified segmented drilling parameter data 498 that correspond to those portions of the drilling that contribute to ILT may be analyzed to determine potential sources of the ILT. Then, drilling parameters may be changed to reduce ILT in later segments drilled or in later wellbores drilled.

In some instances, the methods described herein may be performed in real-time where method to calculate the ILT 274 is calculated as the real-time date is received. Then, if the ILT 274 is observed, the drilling parameters contributing to ILT 274 based on an analysis of the modified segmented drilling parameter data 498 may be adjusted.

In some instances, the methods described herein may be performed on data taken during the drilling of a first wellbore where depth or drilling segment(s) where the ILT 274 identified and potential sources of the ILT 274 may be used to develop a drilling plan and/or when drilling a second wellbore. For example, if the data from drilling the first wellbore indicates that drill bit wear contributes to ILT 274 after a certain depth drilled (e.g., determined from analyzing the modified segmented weight on bit data and modified segmented drill bit rpm data), then, the drilling plan or drilling operation for the second wellbore may include changing the drill bit sooner so as to minimize ILT 274.

The control system also includes a processor for executing methods and analyses described herein. The processor and corresponding computer hardware used to implement the various illustrative blocks, modules, elements, components, methods, and algorithms described herein may be configured to execute one or more sequences of instructions, programming stances, or code stored on a non-transitory, computer-readable medium (e.g., a non-transitory, tangible, computer-readable storage medium containing program instructions that cause a computer system running the program of instructions to perform method steps or cause other components/tools to perform method steps described herein). The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the methods and analyses described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments described herein include, but are not limited to, Embodiment A, Embodiment B, Embodiment C, Embodiment D, Embodiment E, and Embodiment F.

Embodiment A is a method comprising drilling a wellbore penetrating a subterranean formation; collecting drill time data for the drilling; converting the drill time data into segmented drill time data; decomposing the segmented drill time data into IMFs using an empirical mode decomposition; reconstructing the segmented drill time data by combining the IMFs with different weights, thereby producing modified segmented drill time data; and calculating an invisible lost time for the drilling based on the segmented drill time data and the modified segmented drill time data.

Embodiment B is a system comprising a drill string extending into a wellbore penetrating a subterranean formation; a sensor to measure drill time data; and a non-transitory computer-readable medium communicably coupled to the sensor and encoded with instructions that, when executed, cause the system to perform the method of Embodiment A.

Embodiment C is a non-transitory computer-readable medium encoded with instructions that, when executed, cause a system to perform the method of Embodiment A.

Embodiment D is a method comprising converting drill time data into segmented drill time data, wherein the drill time data was collected while drilling a wellbore penetrating a subterranean formation; decomposing the segmented drill time data into IMFs using an empirical mode decomposition; reconstructing the segmented drill time data by combining the IMFs with different weights, thereby producing modified segmented drill time data; and calculating an invisible lost time for the drilling based on the segmented drill time data and the modified segmented drill time data.

Embodiment E is a non-transitory computer-readable medium encoded with instructions that, when executed, cause a system to perform the method of Embodiment D.

Embodiments A, B, and C may optionally include one or more of the following: Element 1: the method further comprising: collecting drilling parameter data for one or more drilling parameters of the drilling; converting the drill time data into segmented drilling parameter data; decomposing the segmented drilling parameter data into drilling parameter IMPs using the empirical mode decomposition; reconstructing the segmented drilling parameter data by combining drilling parameter IMFs with different weights, thereby producing modified segmented drilling parameter data; and analyzing the segmented drilling parameter data for causation indicators of the invisible lost time; Element 2: Element 1 and the method further comprising: changing the one or more drilling parameters that correlate to the causation indicators; Element 3: Element 1 and wherein the one or more drilling parameters comprise at least one selected from the group consisting of: rate of penetration of the drill bit into the subterranean formation, weight on the drill bit, torque applied to a drill string, rotary speed of the drill bit, flow rate of the drilling fluid, and any combination thereof; Element 4: Element 1 and wherein the wellbore is a first wellbore and the invisible lost time is a first invisible lost time, and wherein the method further comprises: drilling a second wellbore penetrating the subterranean formation with different drilling parameters than drilling the first wellbore based on the causation indicators, wherein drilling the second wellbore has a second invisible lost time that is less than the first invisible lost time; Element 5: the method further comprising: identifying a portion of the drilling that contributes to the invisible lost time by identifying a drilling segment within a last of the IMFs having a parabolic shape with a positive amplitude and an upward parabolic trend; Element 6: the method further comprising: identifying a portion of the drilling that contributes to the invisible lost time by identifying a drilling segment within a last of the IMFs having a parabolic shape with a positive amplitude with a downward parabolic trend; Element 7: Element 5 or 6 and the method further comprising: collecting drilling parameter data for one or more drilling parameters of the drilling; converting the drill time data into segmented drilling parameter data; decomposing the segmented drilling parameter data into drilling parameter IMPs using the empirical mode decomposition; reconstructing the segmented drilling parameter data by combining drilling parameter IMFs with different weights, thereby producing modified segmented drilling parameter data; and analyzing the segmented drilling parameter data over the portion of the drilling that contributes to the invisible lost time for the causation indicators of invisible lost time during the portion of the drilling; and Element 8: Element 7 and the method further comprising: changing the one or more drilling parameters that correlate to the causation indicators. Exemplary combinations may include, but are not limited to, Element 1 in combination with Elements 2 and 3; Element 1 in combination with Element 4 and optionally in further combination with Element 3 and/or Element 2 (where the drilling parameter changed is for the second wellbore); and Element 5 and/or Element 6 in combination with any of the foregoing; and Element 5 and 6 in combination.

Embodiments D and E may optionally include one or more of the following: Element 9: the method further comprising: providing drilling parameter data for one or more drilling parameters of the drilling; converting the drill time data into segmented drilling parameter data; decomposing the segmented drilling parameter data into drilling parameter IMPs using the empirical mode decomposition; reconstructing the segmented drilling parameter data by combining drilling parameter IMFs with different weights, thereby producing modified segmented drilling parameter data; and analyzing the segmented drilling parameter data for causation indicators of the invisible lost time; Element 10: Element 9 and wherein the one or more drilling parameters comprise at least one selected from the group consisting of: rate of penetration of the drill bit into the subterranean formation, weight on the drill bit, torque applied to a drill string, rotary speed of the drill bit, flow rate of the drilling fluid, and any combination thereof; Element 11: Element 9 and wherein the wellbore is a first wellbore and the invisible lost time is a first invisible lost time, and wherein the method further comprises: drilling a second wellbore penetrating the subterranean formation with different drilling parameters than drilling the first wellbore based on the causation indicators, wherein drilling the second wellbore has a second invisible lost time that is less than the first invisible lost time; Element 12: the method further comprising: identifying a portion of the drilling that contributes to the invisible lost time by identifying a drilling segment within a last of the IMFs having a parabolic shape with a positive amplitude and an upward parabolic trend; Element 13: the method further comprising: identifying a portion of the drilling that contributes to the invisible lost time by identifying a drilling segment within a last of the IMFs having a parabolic shape with a positive amplitude with a downward parabolic trend; and Element 17: Element 12 or 13 and the method further comprising: providing drilling parameter data for one or more drilling parameters of the drilling; converting the drill time data into segmented drilling parameter data; decomposing the segmented drilling parameter data into drilling parameter IMPs using the empirical mode decomposition; reconstructing the segmented drilling parameter data by combining drilling parameter IMFs with different weights, thereby producing modified segmented drilling parameter data; and analyzing the segmented drilling parameter data over the portion of the drilling that contributes to the invisible lost time for the causation indicators of invisible lost time during the portion of the drilling. Exemplary combinations may include, but are not limited to, Element 9 in combination with Elements 10 and 11; Element 12 in combination with Element 11 and optionally in further combination with one or both of Elements 10 and 11; Element 13 in combination with Element 11 and optionally in further combination with one or both of Elements 10 and 11; and Elements 12 and 13 in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   drilling a wellbore penetrating a subterranean formation;
   collecting drill time data for the drilling;
   converting the drill time data into segmented drill time data;
   decomposing the segmented drill time data into intrinsic mode functions (IMFs) using an empirical mode decomposition;
   reconstructing the segmented drill time data by combining the IMFs with different weights, thereby producing modified segmented drill time data; and
   calculating an invisible lost time for the drilling based on the segmented drill time data and the modified segmented drill time data.

2. The method of claim 1 further comprising:
   collecting drilling parameter data for one or more drilling parameters of the drilling;
   converting the drill time data into segmented drilling parameter data;
   decomposing the segmented drilling parameter data into drilling parameter IMPs using the empirical mode decomposition;
   reconstructing the segmented drilling parameter data by combining drilling parameter IMFs with different weights, thereby producing modified segmented drilling parameter data; and
   analyzing the segmented drilling parameter data for causation indicators of the invisible lost time.

3. The method of claim 2 further comprising:
   changing the one or more drilling parameters that correlate to the causation indicators.

4. The method of claim 2, wherein the one or more drilling parameters comprise at least one selected from the group consisting of: rate of penetration of the drill bit into the subterranean formation, weight on the drill bit, torque applied to a drill string, rotary speed of the drill bit, flow rate of the drilling fluid, and any combination thereof.

5. The method of claim 2, wherein the wellbore is a first wellbore and the invisible lost time is a first invisible lost time, and wherein the method further comprises:
   drilling a second wellbore penetrating the subterranean formation with different drilling parameters than drilling the first wellbore based on the causation indicators, wherein drilling the second wellbore has a second invisible lost time that is less than the first invisible lost time.

6. The method of claim 1 further comprising:
   identifying a portion of the drilling that contributes to the invisible lost time by identifying a drilling segment within a last of the IMFs having a parabolic shape with a positive amplitude and an upward parabolic trend.

7. The method of claim 6 further comprising:
   collecting drilling parameter data for one or more drilling parameters of the drilling;
   converting the drill time data into segmented drilling parameter data;
   decomposing the segmented drilling parameter data into drilling parameter IMPs using the empirical mode decomposition;
   reconstructing the segmented drilling parameter data by combining drilling parameter IMFs with different weights, thereby producing modified segmented drilling parameter data;
   analyzing the segmented drilling parameter data over the portion of the drilling that contributes to the invisible lost time for the causation indicators of invisible lost time during the portion of the drilling.

8. The method of claim 7 further comprising:
   changing the one or more drilling parameters that correlate to the causation indicators.

9. A system comprising:
   a drill string extending into a wellbore penetrating a subterranean formation;
   a sensor to measure drill time data;
   a non-transitory computer-readable medium communicably coupled to the sensor and encoded with instructions that, when executed, cause the system to perform a method comprising:
   drilling the wellbore;
   collecting the drill time data for the drilling;
   converting the drill time data into segmented drill time data;
   decomposing the segmented drill time data into intrinsic mode functions (IMFs) using an empirical mode decomposition;
   reconstructing the segmented drill time data by combining the IMFs with different weights, thereby producing modified segmented drill time data; and
   calculating an invisible lost time for the drilling based on the segmented drill time data and the modified segmented drill time data.

10. The system of claim 9, wherein the method further comprises:
    collecting drilling parameter data for one or more drilling parameters of the drilling;
    converting the drill time data into segmented drilling parameter data;
    decomposing the segmented drilling parameter data into drilling parameter IMPs using the empirical mode decomposition;
    reconstructing the segmented drilling parameter data by combining drilling parameter IMFs with different weights, thereby producing modified segmented drilling parameter data; and
    analyzing the segmented drilling parameter data for causation indicators of the invisible lost time.

11. The system of claim 10, wherein the method further comprises:
    changing the one or more drilling parameters that correlate to the causation indicators.

12. The system of claim 10, wherein the one or more drilling parameters comprise at least one selected from the group consisting of: rate of penetration of the drill bit into the subterranean formation, weight on the drill bit, torque applied to a drill string, rotary speed of the drill bit, flow rate of the drilling fluid, and any combination thereof.

13. The system of claim 10, wherein the wellbore is a first wellbore and the invisible lost time is a first invisible lost time, and wherein the method further comprises:

drilling a second wellbore penetrating the subterranean formation with different drilling parameters than drilling the first wellbore based on the causation indicators, wherein drilling the second wellbore has a second invisible lost time that is less than the first invisible lost time.

14. The system of claim 9, wherein the method further comprises:

identifying a portion of the drilling that contributes to the invisible lost time by identifying a drilling segment within a last of the IMFs having a parabolic shape with a positive amplitude and an upward parabolic trend.

15. The system of claim 14, wherein the method further comprises:

collecting drilling parameter data for one or more drilling parameters of the drilling;

converting the drill time data into segmented drilling parameter data;

decomposing the segmented drilling parameter data into drilling parameter IMPs using the empirical mode decomposition;

reconstructing the segmented drilling parameter data by combining drilling parameter IMFs with different weights, thereby producing modified segmented drilling parameter data;

analyzing the segmented drilling parameter data over the portion of the drilling that contributes to the invisible lost time for the causation indicators of invisible lost time during the portion of the drilling.

16. The system of claim 15, wherein the method further comprises:

changing the one or more drilling parameters that correlate to the causation indicators.

17. A non-transitory computer-readable medium encoded with instructions that, when executed, cause a system to perform a method comprising:

drilling a wellbore penetrating a subterranean formation;

collecting drill time data for the drilling;

converting the drill time data into segmented drill time data;

decomposing the segmented drill time data into intrinsic mode functions (IMFs) using an empirical mode decomposition;

reconstructing the segmented drill time data by combining IMFs with different weights, thereby producing modified segmented drill time data; and calculating an invisible lost time for the drilling based on the segmented drill time data and the modified segmented drill time data.

18. The non-transitory computer-readable medium of claim 17, wherein the method further comprises:

collecting drilling parameter data for one or more drilling parameters of the drilling;

converting the drill time data into segmented drilling parameter data;

decomposing the segmented drilling parameter data into drilling parameter IMPs using the empirical mode decomposition;

reconstructing the segmented drilling parameter data by combining drilling parameter IMFs with different weights, thereby producing modified segmented drilling parameter data; and analyzing the segmented drilling parameter data for causation indicators of the invisible lost time.

19. The non-transitory computer-readable medium of claim 18, wherein the method further comprises:

changing the one or more drilling parameters that correlate to the causation indicators.

20. The non-transitory computer-readable medium of claim 17, wherein the method further comprises:

identifying a portion of the drilling that contributes to the invisible lost time by identifying a drilling segment within a last of the IMFs having a parabolic shape with a positive amplitude and an upward parabolic trend.

* * * * *